C. YEAGER.
SHOCK ABSORBER.
APPLICATION FILED MAR. 15, 1913.
1,077,781.
Patented Nov. 4, 1913.
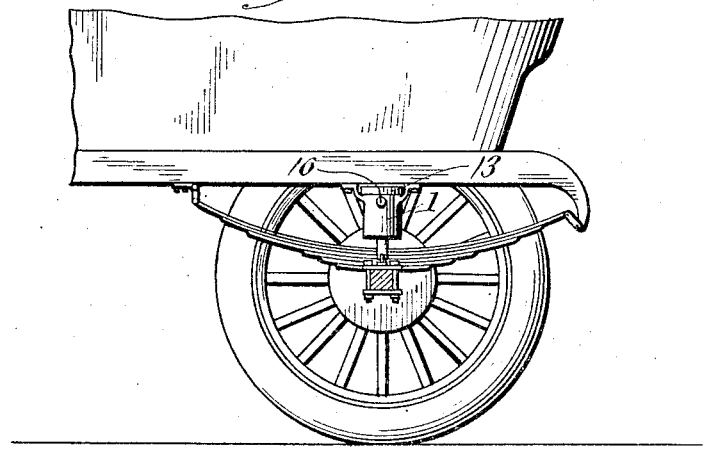
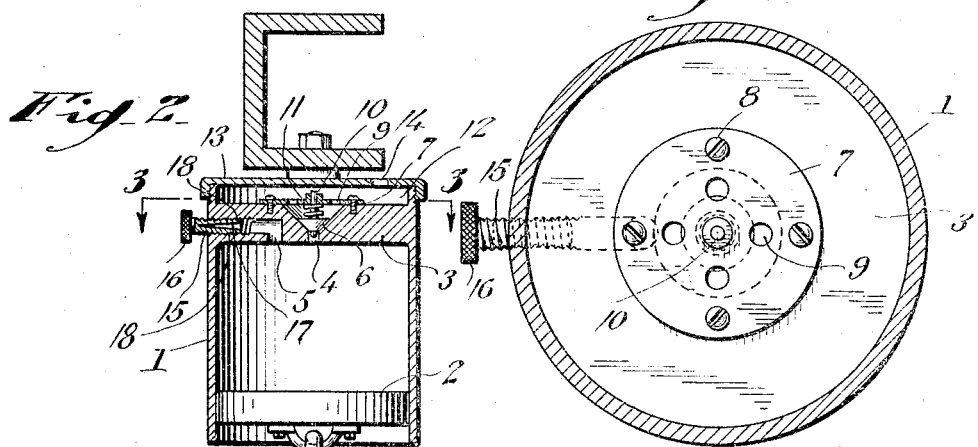
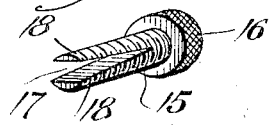
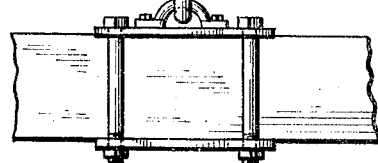
Inventor
Carl Yeager,
By Victor J. Evans
Attorney

UNITED STATES PATENT OFFICE.

CARL YEAGER, OF BIRDSBORO, PENNSYLVANIA.

SHOCK-ABSORBER.

1,077,781. Specification of Letters Patent. Patented Nov. 4, 1913.

Application filed March 15, 1913. Serial No. 754,488.

*To all whom it may concern:*

Be it known that I, CARL YEAGER, a citizen of the United States, residing at Birdsboro, in the county of Berks and State of Pennsylvania, have invented new and useful Improvements in Shock-Absorbers, of which the following is a specification.

The object of this invention is to relieve a vehicle of shock when the same is subjected to a violent movement which ordinarily would tend to disable the springs or cause discomfort to the occupant.

The invention is in the nature of an attachment to be interposed between the axle and body so as to regulate the movement of the vehicle spring and prevent a rapid rebound when the spring tends to regain a normal position after being subjected to an abnormal compression due to a wheel of the vehicle dropping into a rut or depression or passing over an obstruction.

The invention consists of a shock absorber embodying a cylinder and a piston, the latter arranged to operate within the cylinder and said cylinder having a valve controlled outlet for the rapid escape of air when the spring is compressed and provided with a regulable air inlet for admitting air slowly to the cylinder so that the action of the vehicle spring in regaining itself is retarded, thereby preventing the rebound which is the chief cause of discomfort to the occupant of the vehicle and which causes disabling of the springs and furthermore is prolific of excessive wear upon the running gear and the engine of mechanically propelled vehicles such as automobiles.

The invention consists of the novel features, details of construction and combination of parts, which hereinafter will be more particularly set forth, illustrated in the accompanying drawing, and pointed out in the appended claims.

Referring to the drawing, forming a part of the specification, Figure 1 is a detail view of part of a vehicle provided with a shock absorber embodying the invention. Fig. 2 is a sectional view, showing the parts on a larger scale. Fig. 3 is a horizontal section on the line 3—3 of Fig. 2, showing the parts on a further enlarged scale. Fig. 4 is a detail perspective view of the regulator for controlling the admission of air into the cylinder.

Corresponding and like parts are referred to in the following description, and indicated in all the views of the drawing, by the same reference characters.

The shock absorber comprises a cylinder 1 and a piston 2 arranged to operate therein. The cylinder is closed at one end by means of a head 3 in which is formed an opening 4 and a passage 5, the latter leading from the interior of the cylinder through a side thereof and providing for the inflow of air when the piston 2 moves outwardly within the cylinder. The opening 4 is centrally disposed in the head 3 and is outwardly flared to form a seat for a conical valve 6. A plate 7 is secured to the outer side of the head 3 by means of fastenings 8 and is provided with a plurality of openings 9 for the escape of air from the cylinder when the piston 2 moves inwardly therein. The stem 10 of the valve 6 extends through an opening formed in the center of the plate 7 and is guided thereby to direct the valve 6 in its movements. A helical spring 11 is mounted upon the valve stem 10 and is confined between the plate 7 and valve 6 and normally exerts a pressure to hold said valve seated. The head 3 is set in a short distance from the adjacent end of the cylinder 1, thereby leaving a space 12 in which is located the plate 7 and projecting end of the valve stem 10. A cap 13 is fitted to the projecting end of the cylinder 1 and is secured thereto in any manner and closes the space 12 and prevents dust and other foreign matter from interfering with the free operation of the valve 6. An opening 14 is formed in the cap 13 for the escape of the air forced from the cylinder when the piston 2 is pressed inward therein.

The passage 5 is substantially of L form and its outer portion is interiorly threaded to receive the regulator 15 by means of which the admission of air into the cylinder is controlled. The air regulator 15 consists of a stem which is externally threaded to make screwthread connection with the passage 5, said stem having a milled head 16 to be grasped when setting the regulator to control the inflow of air through the passage 5. A longitudinal slot 17 is formed in the stem 16 and tapers throughout its length, being contracted at its inner end and widened at its outer end. The parts 18 separated by the slot 17 are spread to cause them to bind against the threaded portion of the passage 5, thereby holding the regulator in the required adjusted position. When the regulator is in position in the threaded part of the passage 5 the spring members 18 are held compressed, the result being that a positive frictional engagement is preserved between the regulator and threaded portion of the passage 5 to prevent any casual movement of the regulator after being set. By reason of the outward flare of the slot 17 it will be understood that when the regulator is backed or moved outward in the passage 5 the area of the air inlet is increased and conversely as the regulator is moved inward within the passage 5 the area of the air inlet is contracted, hence it follows that movement of the regulator varies the air inlet and controls the outward movement of the piston 2 in the cylinder 1 so that the action of the vehicle spring in regaining itself after being compressed is controlled to prevent discomfort to the occupant of the vehicle or injury to the vehicle spring, parts of the running gear or the engine or mechanism mounted thereon.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claims appended hereto.

Having thus described the invention what is claimed as new, is:—

1. A shock absorber for vehicles comprising a cylinder having a valve controlled outlet and a passage for the inflow of air, a piston arranged to operate in the cylinder, and a regulator threaded into the air inlet and provided in its length with a flaring slot to admit of varying the air inlet by setting the regulator in or out.

2. A shock absorber comprising a cylinder having a head near one end in which is formed an outwardly flared opening for the discharge of air and a passage for the inflow of air, a piston arranged to operate in the cylinder, a plate secured to the outer side of the cylinder head and extending over the flared opening thereof and provided with a central and side openings, a valve for closing downward in the said flared opening and having a stem projecting through the central opening of the said plate, a helical spring mounted upon the stem of the valve and confined between the latter and the plate and normally exerting a pressure to hold the valve seated, and a regulator threaded into the air inlet passage and provided in its length with a flaring slot to admit of varying the effective area of the air inlet.

In testimony whereof I affix my signature in presence of two witnesses.

CARL YEAGER.

Witnesses:
CARRIE WIAND,
EMERSON W. RITCHEY.